United States Patent
Takahashi et al.

(10) Patent No.: US 8,374,718 B2
(45) Date of Patent: Feb. 12, 2013

(54) NUMERICAL CONTROL METHOD AND APPARATUS THEREFOR

(75) Inventors: Nobuyuki Takahashi, Chiyoda-ku (JP); Takashi Kamiya, Chiyoda-ku (JP); Daisuke Kanaya, Nagoya (JP); Tadahiro Otsuka, Nagoya (JP); Ryoichi Ikeda, Nagoya (JP)

(73) Assignee: Mitsubishi Electric Corporation, Tokyo (JP)

( * ) Notice: Subject to any disclaimer, the term of this patent is extended or adjusted under 35 U.S.C. 154(b) by 309 days.

(21) Appl. No.: 12/988,924

(22) PCT Filed: Apr. 22, 2008

(86) PCT No.: PCT/JP2008/057733
§ 371 (c)(1),
(2), (4) Date: Oct. 21, 2010

(87) PCT Pub. No.: WO2009/130759
PCT Pub. Date: Oct. 29, 2009

(65) Prior Publication Data
US 2011/0035044 A1 Feb. 10, 2011

(51) Int. Cl.
G06F 19/00 (2011.01)
G05B 19/04 (2006.01)
G05B 19/18 (2006.01)
G05B 19/41 (2006.01)
G05B 19/25 (2006.01)

(52) U.S. Cl. ... 700/178; 700/189; 700/255; 318/568.15; 318/573

(58) Field of Classification Search ............... 700/159, 700/174, 177, 178, 189, 192, 245, 250, 255; 318/568.11, 568.15, 569, 570, 573
See application file for complete search history.

(56) References Cited

U.S. PATENT DOCUMENTS

| | | | | |
|---|---|---|---|---|
| 4,624,607 A * | 11/1986 | Kato et al. | ............ | 408/1 R |
| 5,043,906 A * | 8/1991 | Jepson | ............ | 700/192 |
| 5,297,060 A * | 3/1994 | Foletti et al. | ............ | 702/6 |
| 5,440,213 A * | 8/1995 | Arita et al. | ............ | 318/568.11 |
| 7,003,373 B2 * | 2/2006 | Baumann et al. | ............ | 700/189 |
| 7,734,397 B2 * | 6/2010 | Peterson et al. | ............ | 701/50 |
| 2004/0225405 A1 | 11/2004 | Takahashi et al. | | |
| 2006/0041325 A1 | 2/2006 | Naganawa et al. | | |
| 2007/0229015 A1 * | 10/2007 | Yoshida et al. | ............ | 318/568.21 |
| 2008/0125874 A1 | 5/2008 | Takahashi et al. | | |

FOREIGN PATENT DOCUMENTS

| | | |
|---|---|---|
| JP | 09-081218 A | 3/1997 |
| JP | 2004-227047 A | 8/2004 |
| JP | 2004-326257 A | 11/2004 |
| JP | 2006-059187 A | 3/2006 |
| JP | 2006-195862 A | 7/2006 |
| JP | 2007-172068 A | 7/2007 |

* cited by examiner

Primary Examiner — Crystal J Barnes-Bullock
(74) Attorney, Agent, or Firm — Sughrue Mion, PLLC (57) ABSTRACT

A preceding-check processing sequence is provided separately from a machine-control processing sequence for an actual machine control, to make it possible to perform a collision check at an accurate position from an operation restart time of a machining program even when an operator interrupts an operation in the middle of the machining program or when the operator interrupts the operation as having detected a collision. This preceding-check processing sequence performs a collision possibility check ahead of an actual machine control. In this arrangement, there is provided a control-state synchronizing unit that matches a state of the preceding-check processing sequence with a state of the machine-control processing sequence during a period from when a machine stops until when the machine restarts an operation.

16 Claims, 7 Drawing Sheets

(A) RANGE HAVING POSSIBILITY THAT SKIP SIGNAL IS INPUT (B) FINAL MOVEMENT POSITION WHEN SKIP SIGNAL IS NOT INPUT

FIG.6

POSITION OF PRECEDING-CHECK PROCESSING SEQUENCE IS MATCHED WITH POSITION OF ACTUAL MACHINE BY MATCHING CONTROL STATE

NUMERICAL CONTROL METHOD AND APPARATUS THEREFOR

TECHNICAL FIELD

The present invention relates to a numerical control (hereinafter, "NC") method and an apparatus therefor that prevent a collision beforehand, and more particularly relates to speeding up of a collision check for checking a collision (an interference) between a tool and a workpiece, between a tool and a jig, and between a machine and peripheral instruments and to an improvement of accuracy of the collision check.

BACKGROUND ART

In recent years, an operation of an NC machine tool has become complicated because of its multi-axis and multi-system configuration, and an NC apparatus has come to include a function of preventing a collision (see, for example, Patent Document 1).

To stop an actual machine before a collision, a check of the presence of a collision needs to be performed prior to an actual machine operation. For this purpose, an NC apparatus is configured to delay an instruction output to a machine by a time necessary to decelerate to a position where a collision is detected (see, for example, Patent Document 2).

Another NC apparatus is configured to calculate a virtual movement position in the next axis control cycle, calculate a distance necessary until when an operation stops by deceleration from an axis moving speed at this time, and perform a proximity check between parts of a machine at the distance (see, for example, Patent Document 3).

Normally, in an NC apparatus, a programmable logic controller (hereinafter, "PLC") or a function equivalent thereto processes a command concerning an instrument other than an NC control axis, such as a tool replacement, turning of a turret tool post, and taking in and out of a tailstock instructed by an M.T instruction from a machining program, for example, (hereinafter, position-controlled instrument other than an NC control axis is referred to as "auxiliary machine"). The PLC also processes a state of an instrument such as a door lock sensor and a machine control panel.

A state quantity of an instrument including each auxiliary machine and sensor is allocated to a signal to a device of the PLC. For example, when an operation is completed, a signal of a certain device becomes ON, and the NC apparatus proceeds to the next process based on this. In this manner, the instrument takes a handshake with the device (hereinafter, "instrumental device").

Patent Document 1: Japanese Patent Application Laid-open No. 2004-227047
Patent Document 2: Japanese Patent Application Laid-open No. 2007-172068
Patent Document 3: Japanese Patent Application Laid-open No. 2006-195862

DISCLOSURE OF INVENTION

Problem to be Solved by the Invention

Figure 9:
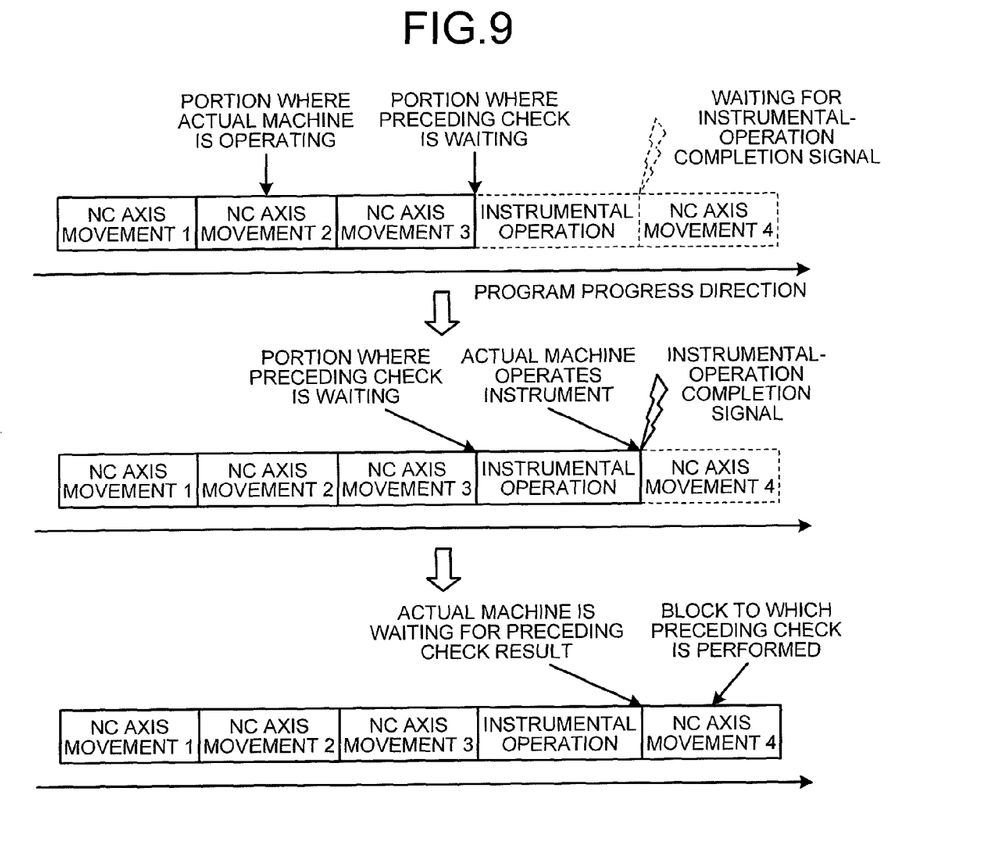
FIG. 9 is an explanatory diagram of a problem of a conventional technique.

According to a conventional NC apparatus described above, as shown in FIG. 9, generation of a preceding position instruction to check the presence of a collision is incorporated in a process to control an actual machine tool. Therefore, when it is not possible to proceed to the next process without waiting for a completion of an operation of an auxiliary machine, generation of the preceding position instruction needs to be temporarily stopped.

Particularly, in a case of an NC control apparatus that checks the presence of a collision based on three-dimensional shape data, when generation of an instruction is stopped each time when a state of the auxiliary machine is awaited, a waiting time of a machining program as a whole becomes relatively long, because the time necessary for a collision checking process is larger than that of a process of the NC axis control.

Further, a collision checking process is performed by having a virtual machine and a virtual workpiece incorporated in a computer, and a collision is detected by operating the virtual machine and the virtual workpiece by simulation prior to an actual machine operation. Therefore, a block of a machining program where the actual machine has not yet reached is performed so long as a portion which does not require a handshake with the auxiliary machine described above is performed. However, when a collision checking process is performed ahead, the following problem occurs.

Figure 10:
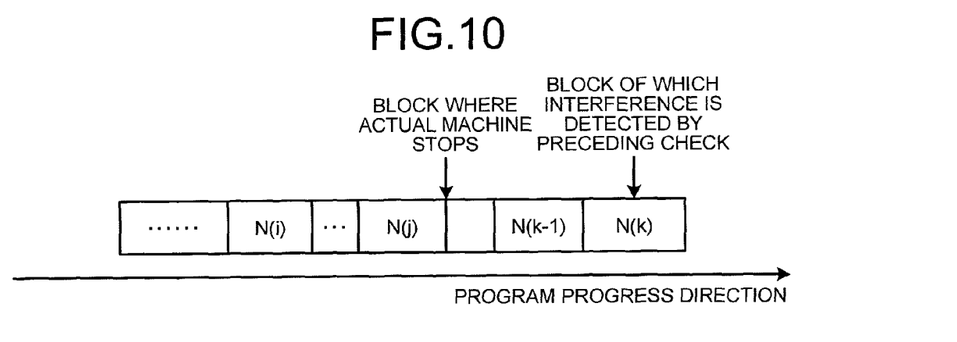
FIG. 10 is an explanatory diagram of another problem of a conventional technique.

Assume that an actual machine is performing an ith block of a machining program and that a collision checking process at this time is performing a kth (i<k) block as shown in FIG. 10, for example. When the collision checking process detects a collision in this state, the actual machine stops before a jth block (a block at jth in FIG. 12).

Therefore, in a case of an NC apparatus having a function that a collision checking process performs a cutting simulation of a workpiece using shape data, a shape of the workpiece is changed to a shape already cut by a command not actually processed yet. Therefore, when an operator manually compares an NC axis or corrects a machining program after the machine stops and thereafter automatically operates the machine again, the shape does not match that of an actual material, and a collision cannot be detected accurately.

The present invention has been made to solve the above problems, and an object of the present invention is to obtain an NC apparatus capable of accurately checking a collision and suppressing an increase of a processing time as far as possible even when a machining program is operated by validating a collision check function.

Means for Solving Problem

A numerical control method according to the present invention provides a preceding-check processing sequence separately from a machine-control processing sequence for an actual machine control, wherein the numerical control method includes performing a collision possibility check in the preceding-check processing sequence ahead of an actual machine control, and a state of the preceding-check processing sequence is matched with a state of the machine-control processing sequence during a period from when a machine stops until when the machine restarts an operation.

In the numerical control method according to the present invention, the state is a present value.

In the numerical control method according to the present invention, the state is a present value, a selected tool, a control mode, a coordinate system, signals held in a device for a programmable logic control, and material shape data.

In the numerical control method according to the present invention, the preceding-check processing sequence stops performing a collision possibility check during execution of a specific command.

In the numerical control method according to the present invention, the specific command is a skip command.

In the numerical control method according to the present invention, when performing an instrumental-device signal simulation to check a collision, the preceding-check processing sequence obtains a response time for each device set in advance, and delays a response by the obtained response time for each device.

In the numerical control method according to the present invention, the preceding-check processing sequence calculates a feeding speed for a preceding check based on a distance, at which a collision is regarded to occur, and an interpolation cycle, calculates a rate of a feeding speed for a preceding check to a feeding speed described in a machining program, and determines a feeding speed for a preceding check based on the calculated rate.

In the numerical control method according to the present invention, when performing an instrumental-device signal simulation to check a collision, the preceding-check processing sequence obtains a response time for each device set in advance, and adjusts the obtained response time for each device based on the rate of a feeding speed.

A numerical control apparatus according to the present invention includes: a machine-control processing sequence that includes a machining-program analyzing unit, a feeding speed controller, an instruction generating unit, a programmable-logic control unit, and an instruction-output determining unit that receives a check result from a preceding-check processing sequence and stops a machine before the machine reaches a collision detection position when a collision is detected, and performs an actual machine control; the preceding-check processing sequence that includes a machining-program analyzing unit, a feeding speed controller, an instruction generating unit, a programmable-logic control unit, a collision checking processor that checks a collision possibility by using shape data and delivers a check result to an instruction-output determining unit of the machine-control processing sequence, and an instrumental-device-signal simulating unit that simulates a response signal of a device allocated to an instrument other than an NC control axis, and performs a collision possibility check ahead of an actual machine control by the machine-control processing sequence; a monitor display unit that simulates by using shape data a state of machining with an actual machine, and sequentially displays a simulation on a screen; and a control-state synchronizing unit that matches a state of the preceding-check processing sequence with a state of the machine-control processing sequence during a period from when a machine stops until when the machine restarts an operation.

In the numerical control apparatus according to the present invention, the state is a present value.

In the numerical control apparatus according to the present invention, the state is a present value, a selected tool, a control mode, a coordinate system, signals held in a device for a programmable logic control, and material shape data.

In the numerical control apparatus according to the present invention, the preceding-check processing sequence stops performing a collision possibility check during execution of a specific command.

In the numerical control apparatus according to the present invention, the specific command is a skip command.

In the numerical control apparatus according to the present invention, when performing an instrumental-device signal simulation to check a collision, the instrumental-device-signal simulating unit of the preceding-check processing sequence obtains a response time for each device set in advance, and delays a response by the obtained response time for each device.

In the numerical control apparatus according to the present invention, the preceding-check processing sequence includes a speed-rate calculating unit that calculates a feeding speed for a preceding check based on a distance at which a collision is regarded to have occurred and an interpolation cycle and calculates a rate of a feeding speed for a preceding check to a feeding speed described in a machining program, and determines a feeding speed for a preceding check based on the calculated rate.

In the numerical control apparatus according to the present invention, when performing an instrumental-device signal simulation to check a collision, the instrumental-device-signal simulating unit of the preceding-check processing sequence obtains a response time for each device set in advance, and adjusts the obtained response time for each device based on the rate of a feeding speed.

Effect of the Invention

According to the present invention, a preceding-check processing sequence is provided separately from a machine-control processing sequence for an actual machine control, and a state of the preceding-check processing sequence is matched with a state of the machine-control processing sequence during a period from when a machine stops until when the machine restarts an operation. Therefore, a preceding checking process can be performed without waiting for a response of an actual machine. Further, a collision check can be performed at a correct position at an operation restart time of a machining program even when an operator interrupts the operation in the middle of the machining program or interrupts the operation as having detected a collision.

According to the present invention, because a collision check is not performed to a specific command set in advance to a tool measurement for a tool to be in contact with a tool measurement sensor as a part of a machine, the machine can be operated without causing a situation that the command permitting the contact as the machine's primary operation is determined as a collision.

According to the present invention, at the time of performing an instrumental-device signal simulation to check a collision, a response is delayed by a response time for each device set in advance. Therefore, an operation can be performed as if an instrument operates at the same timing as that of an actual machine, and the precision of a collision check is improved.

According to the present invention, to safely and quickly generate a check position necessary for a preceding checking process, a rate that becomes a feeding speed is calculated corresponding to a distance at which a collision is regarded to occur at a feeding speed of an actual machine. Therefore, a collision check can be always ahead of a position where an actual machine is processing, and thus a machining time is not increased even when the collision check is performed.

According to the present invention, at the time of performing an instrumental-device signal simulation to check a collision, a response time for each device set in advance is adjusted based on a rate of a feeding speed. Therefore, a movement of an actual machine, a movement of an NC axis and a response of an instrument can be shortened at the same rate. Consequently, a signal generation timing and a relative positional relationship of all machine portions including an auxiliary machine become the same as those of an actual machine, and thus even when a collision check is performed, a machining time is not increased, and the precision of a collision check is improved.

EXPLANATIONS OF LETTERS OR NUMERALS

1 Machine-control processing sequence
2 Preceding-check processing sequence
3, 12 Program analyzing unit
4, 13 Feeding speed controller
5, 14 Instruction generating unit
6, 16 Programmable-logic control unit
7 Servo controller and motor
8, 17 Control data
9 Input/output signal of instrumental device
10, 18 Shape data
11 Cutting monitoring unit
15 Instrumental-device-signal simulating unit
19 Collision checking unit
20 Machining program, tool data, parameter
21 Control-state synchronizing unit
22 Instruction-output determining unit
23 Speed-rate calculating unit

BEST MODE(S) FOR CARRYING OUT THE INVENTION

First Embodiment

A first embodiment of the present invention is explained below with reference to FIGS. 1 to 6. The first embodiment is an embodiment in which a preceding-check processing sequence operates at the same speed as that of a machine-control processing sequence.

Figure 1:
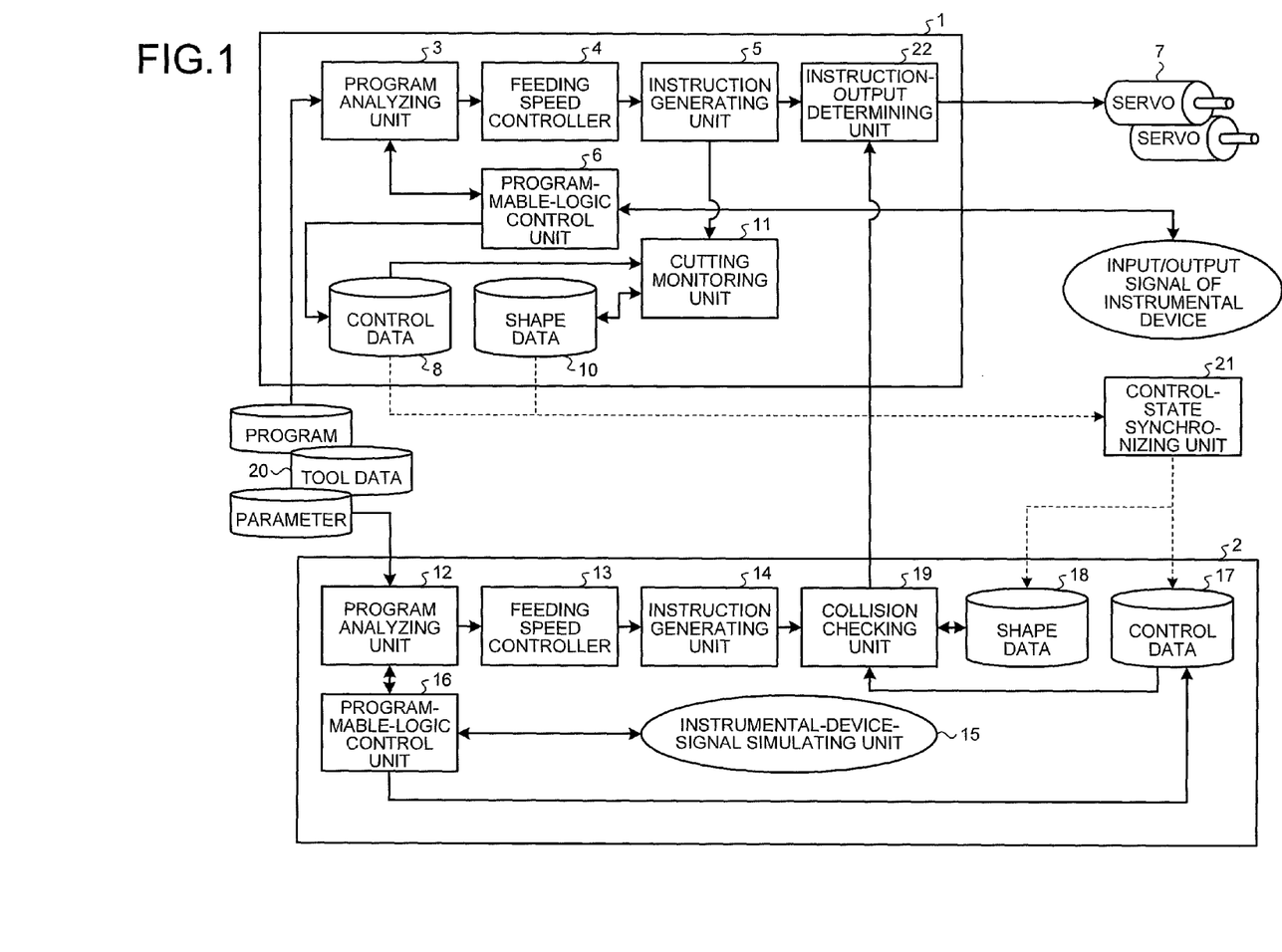
FIG. 1 is a block diagram of a configuration example of an NC apparatus according to a first embodiment of the present invention.

FIG. 1 is a block diagram of a configuration of an NC apparatus according to the first embodiment of the present invention, where reference numeral 1 denotes a machine-control processing sequence that controls an actual machine, 2 denotes a preceding-check processing sequence that checks a collision possibility prior to an operation of an actual machine, 3 denotes a machining-unit-program analyzing unit that is in the machine-control processing sequence and analyzes a machining program, 4 denotes a feeding speed controller that is in the machine-control processing sequence 1 and controls a feeding speed of a tool, 5 denotes an instruction generating unit that is in the machine-control processing sequence 1 and generates an instruction value of each axis, 6 denotes a programmable-logic control unit (hereinafter, "PLC") that controls a signal input/output of an instrumental device and stores a signal necessary for an NC control out of all signals into control data, 7 denotes an NC servo controller and a motor connected to the machine-control processing sequence 1, 8 denotes control data (because the control data is referenced from each process unit within the NC apparatus, a line connection to any processing unit is intentionally omitted) that includes signals of a control mode at the time of controlling an actual machine in the machine-control processing sequence 1 such as an interpolation type, a plane selection, and a tool system correction, a coordinate system, a present coordinate value of each axis (hereinafter, "present value"), a selected tool, and an instrumental device, 9 denotes an input/output signal of an instrumental device connected to the machine-control processing sequence 1, 10 denotes shape data of a machine, a tool, a jig, and a material to display an operation of an actual machine by a shape simulation in the machine-control processing sequence 1, and 11 denotes a cutting monitoring unit that, by using the shape data 10, displays an operation of an actual machine by performing a simulation and displays a state of cutting a material.

Further, 12 denotes a machining-program analyzing unit that analyzes a machining program in the preceding-check processing sequence 2, 13 denotes a feeding speed controller that controls a feeding speed of a tool in the preceding-check processing sequence 2, 14 denotes an instruction generating unit that generates an instruction value of each axis in the preceding-check processing sequence 2, 15 denotes an instrumental-device-signal simulating unit that simulates an input/output signal of an instrumental device in the preceding-check processing sequence 2, 16 denotes a PLC that controls a signal input/output of the instrumental-device-signal simulating unit 15 and stores a signal necessary for an NC control out of all signals into control data, 17 denotes control data that includes signals of a control mode to simulate a movement of a machine to check a collision in the preceding-check processing sequence 2 such as a present value, an interpolation type, a plane selection, and a tool system correction, a coordinate system, a selected tool, and an instrumental device, 18 denotes shape data of a machine, a tool, a jig, and a material to perform a collision check in the preceding-check processing sequence 2, 19 denotes a collision checking unit that performs a shape simulation by using the shape data 18 and performs a collision possibility and material-cutting simulation in the preceding-check processing sequence 2, 20 denotes data for NC control such as a machining program, tool data, and control parameters referenced in common by the machine-control processing sequence 1 and the preceding-check processing sequence 2, 21 denotes a control-state synchronizing unit that sets in the preceding-check processing sequence 2 control data and shape data (or, only material shape data obtained by a cutting simulation by a cutting monitoring unit out of shape data) of the machine-control processing sequence 1, and sets data of the preceding-check processing sequence 2 the same as data of the machine-control processing sequence 1, and 22 denotes an instruction-output determining unit that inputs signals of the instruction generating unit 5 and the collision checking unit 19, and determines whether to stop an output of a movement instruction to a machine.

An operation of each processing unit of the NC apparatus according to the configuration shown in FIG. 1 is explained next.

The program analyzing unit 3 (12) analyzes a command described in the machining program 20. The program analyzing unit 3 (12) sets a feeding speed, sets an interpolation mode at an instruction generation time, and sets a coordinate value, for example, when the command described in the machining program 20 is a command concerning an NC axis control. The program analyzing unit 3 (12) transmits the command to the PLC 6 (16), when the command is to be processed by the PLC 6 (16).

The feeding speed controller 4 (13) calculates a feeding speed per an interpolated cycle time, based on a feeding speed read by the program analyzing unit 3 (12).

The instruction generating unit 5 (14) interpolates on an instruction locus, by using various data set by the program analyzing unit 3 (12) and using a feeding speed per an interpolated cycle time calculated by the feeding speed controller 4 (13), and calculates a position of a movement per an interpolated cycle time.

The PLC 6 (16) outputs an operation signal to an instrumental device not directly controlled by the NC apparatus out of commands directed to the machining program 20, receives an operation completion notification from an instrument connected to the device, performs a control, and lets the signal held as control data within the NC apparatus.

These processors perform the same process both in the machine-control processing sequence 1 and in the preceding-check processing sequence 2.

The collision checking unit 19 in the preceding-check processing sequence 2 obtains at each time when one instruction is generated a signal of an instrumental device simulated by the instrumental-device-signal simulating unit 15 held in an instruction and control data from the instruction generating unit 14. The collision checking unit 19 operates shape data (including a shape of an auxiliary machine such as a turret tool post and a tailstock as well as a shape operated by the NC control axis) of each portion of a machine, tool shape data, shape data of a jig such as a chuck, a claw, a vise, and a clamp, and material shape data, set in advance within a computer until when a machining program is operated. The collision checking unit 19 performs a cutting simulation to a material shape, checks a possibility of a collision between these shapes, and transmits a check result to the instruction-output determining unit 22 of the machine-control processing sequence 1 each time after one instruction or one block is checked.

While there are various methods concerning a detailed method of checking a collision between shapes and a cutting simulation method of shape data, the use of any method does not affect the scope of the claims of the present invention, and thus any method can be used.

Further, when shapes approach close to each other at a distance equal to or smaller than a distance set in advance, this distance can be regarded as a cause of a collision, not to mention that shapes actually collide against each other is a collision.

Further, a check result transmitted by the collision checking unit 19 includes at least data indicating whether a collision has occurred. Further, this data can include data of a part number and a part name identifying a collided portion, data of a block number to identify a collided block, data of an instruction number allocated by the instruction generating unit at an instruction generation time to identify an instruction of a collision, and a distance between shapes at which a collision is regarded to have occurred.

The instrumental-device-signal simulating unit 15 has each of a response time of an instrumental device connected to an actual machine-control processing sequence 1 set in advance, a command to each instrumental device and a response signal to this command (for example, a tool-exchange completion signal in a case of a tool exchange command, and an arrangement completion signal of a tool measuring instrument and a target position of a positioning of a tailstock in the case of an arrangement of a tool measuring instrument). When a command reaches an instrumental device, the instrumental-device-signal simulating unit 15 returns a response signal to the PLC 16 after a lapse of a response time for each instrumental device.

The cutting monitoring unit 11 in the machine-control processing sequence 1 operates shape data of each portion of a machine, tool shape data, jig shape data, and material shape data set in advance until when the machining program 20 is operated, within a computer based on an instruction and an instrument signal from the instruction generating unit 5 of the machine-control processing sequence 1. The cutting monitoring unit 11 performs a cutting simulation to a material shape, and constantly displays a state of this simulation on a display device.

Because the display device is a very common device in the NC apparatus, it is not shown in explanatory diagrams.

When the collision checking unit 19 of the preceding-check processing sequence 2 performs a preceding check and notifies a collision to the instruction-output determining unit 22, the instruction-output determining unit 22 of the machine-control processing sequence 1 stops an output of a movement instruction to a machine, thereby safely stopping a movement of each portion of the machine. The cutting monitoring unit 11 highlights a portion of a collision included in check result data transmitted from the preceding-check processing sequence 2 and displays an alarm.

On the other hand, when the collision checking unit 19 notifies to the instruction-output determining unit 22 that there is no collision regarding an instruction presently checked, the instruction-output determining unit 22 of the machine-control processing sequence 1 outputs to the servo motor 7 that a collision check is completed and performs an axis operation of an actual machine.

Subsequent instructions are similarly processed by repeating the processes described above, and machining is proceeded.

Further, the machine-control processing sequence 1 operates a machine after confirming that the preceding-check processing sequence 2 is always preceding by a time set in advance, or by a block number, or by a distance set in advance. When the preceding-check processing sequence 2 is not preceding by a preceding quantity set in advance, the feeding speed is gradually decreased, and the speed is accelerated to return to an original feeding speed when the preceding-check processing sequence 2 becomes preceding by the set preceding quantity.

An operation of the control-state synchronizing unit 21 is explained next.

An operator operating an NC machine installed with the NC apparatus of the present invention selects a machining program to start machining by using an input unit such as a keyboard or a mouse (not shown), and causes the NC apparatus to perform the operation of the machining program by a starting device such as an operation start button. Consequently, each processing unit explained above progresses a machining by repeating operations in order.

Figure 2:
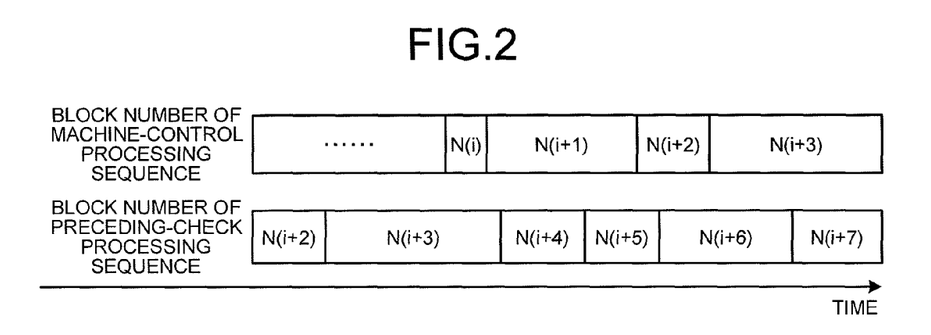
FIG. 2 is an explanatory diagram of a progress status of processes of a machine-control processing sequence and a preceding-check processing sequence according to the first embodiment of the present invention.

Meanwhile, when a collision checking unit of the preceding-check processing sequence 2 detects a collision and a machine stops in the middle of the operation, or when an operator controls to cancel the operation in the middle of the machining program, as shown in FIG. 2, a portion of the machining program that the preceding-check processing sequence 2 is processing at present (a block number N(i+7) of the preceding-check processing sequence 2 in FIG. 2) is different from a portion of the machining program that the machine-control processing sequence 1 is processing (a block number N(i+3) of the machine-control processing sequence 1 in FIG. 2).

Figure 3:
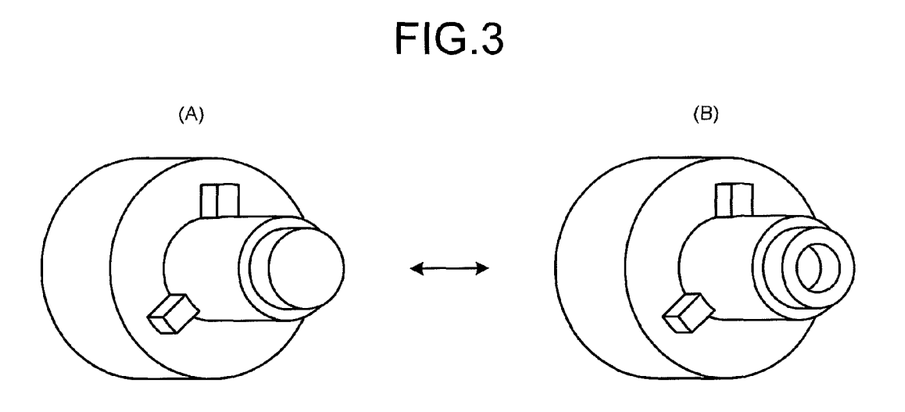
FIG. 3 is a diagram of material shape data of the machine-control processing sequence and the preceding-check processing sequence according to the first embodiment of the present invention at a predetermined time.

In this state, material shape data of the machine-control processing sequence 1 is in a state shown in FIG. 3(A), for example, and material shape data of the preceding-check processing sequence 2 is in a state shown in FIG. 3(B), for example. That is, the material shape data used by the collision checking unit 19 of the preceding-check processing sequence 2 is in a state that a portion not actually cut in the actual material is cut, or although an operation completion signal is already activated in the instrumental device of the preceding-check processing sequence 2, an instrumental device at a machine control side is not operating yet and an operation completion signal is not activated. In this way, states are different between processing sequence within the NC apparatus.

When the machining program is performed again in this state, a collision check cannot be performed accurately because a state of the preceding-check processing sequence 2 is different from that of the machine-control processing sequence 1.

Figure 4:
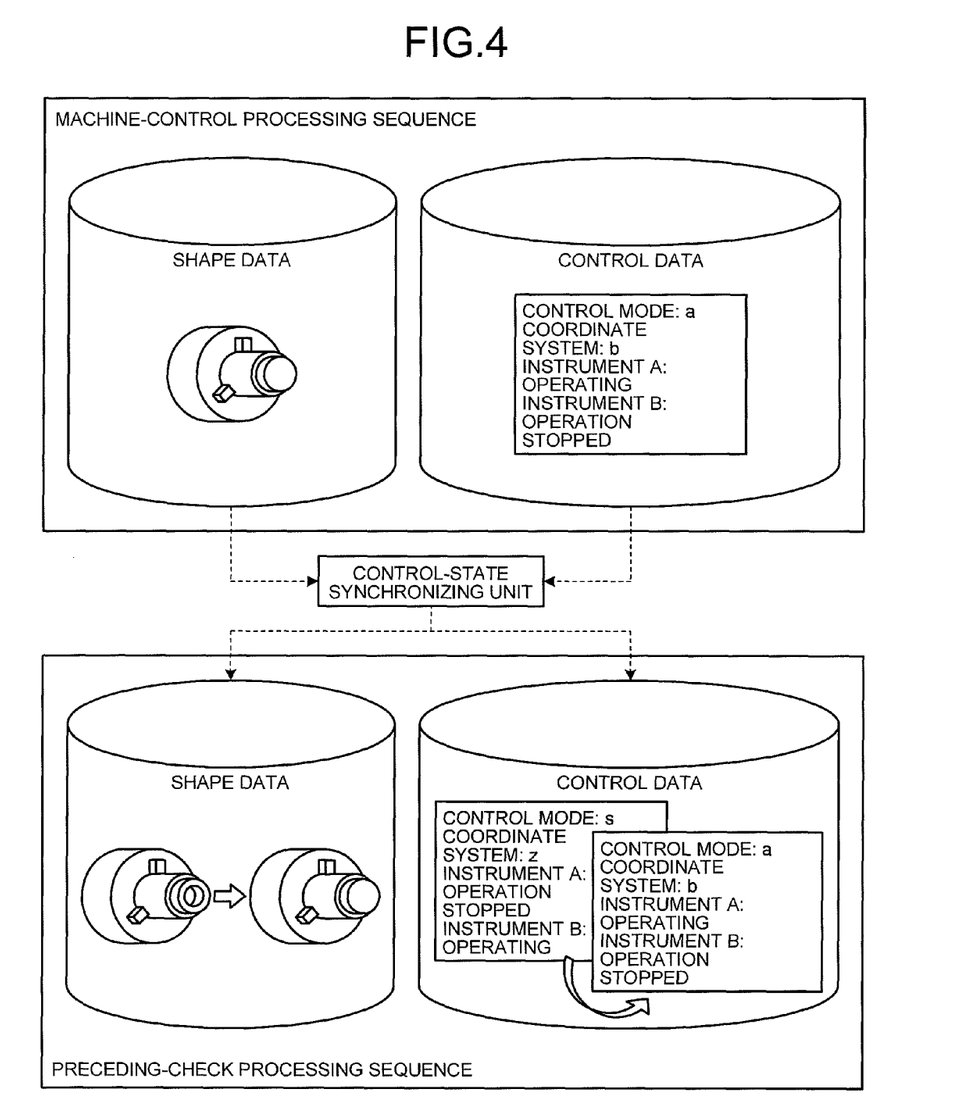
FIG. 4 is an explanatory diagram of an operation of a control-state synchronizing unit according to the first embodiment of the present invention.

Therefore, as shown in FIG. 4, the control-state synchronizing unit 21 performs a process of matching the state of the preceding-check processing sequence 2 with the state of the machine-control processing sequence 1 at the time of canceling an automatic operation of the machining program. The state in this case is shape data and control data.

The control-state synchronizing unit 21 always monitors whether the automatic operation of the machining program is stopped in the middle. When the automatic operation is stopped in the middle of the machining program, the control-state synchronizing unit 21 transfers at least material shape data within the machine-control processing sequence 1 as the material shape data 18 of the preceding-check processing sequence 2 and replaces the data. Similarly, the control-state synchronizing unit 21 transfers the control data 8 within the machine-control processing sequence 1 and replaces the data as the control data 17 within the preceding-check processing sequence 2.

In the above descriptions, the control-state synchronizing unit 21 can combine these states at the time of starting the operation of the machining program, or can match states at the time of starting the operation of the machining program and match material shape data when the automatic operation of the machining program is stopped.

Figure 5:
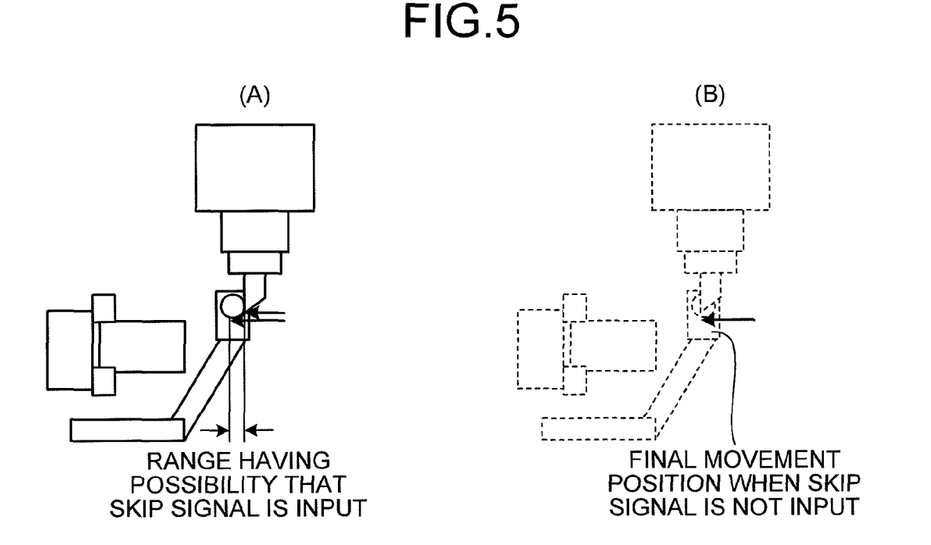
FIG. 5 is an explanatory diagram of an operation of a skip command according to the first embodiment of the present invention.

Some NC apparatuses also have functions of correcting abrasion by measuring a tool with a tool measurement sensor during an automatic operation of a machining program, and delivering a material between cutting main axes when a machine has two cutting main axes. As shown in FIG. 5(A), these functions use a command (a skip command) to stop an axis feed at an intermediate position if a signal is input from an instrument such as a tool measurement sensor or a press sensor until when a material reaches an instructed position described by the machining program.

A method of matching a state of the preceding-check processing sequence 2 with a state of the machine-control processing sequence 1 at the time of performing such a command to change an end position by a signal from an instrument is explained below.

In a skip command, a moved position of an axis changes depending on a timing when a signal is input from an instrument such as an actual sensor. Therefore, as shown in FIG. 5(B), when this command is analyzed by the program analyzing unit 12 of the preceding-check processing sequence 2, the command is executed without the collision checking unit 19 performing a collision check to all shapes. The preceding-check processing sequence 2 is temporarily stopped at a portion where the execution of the command is finished (a position where an operation is finished by assuming that a signal from the instrument is not present in the middle).

Figure 6:
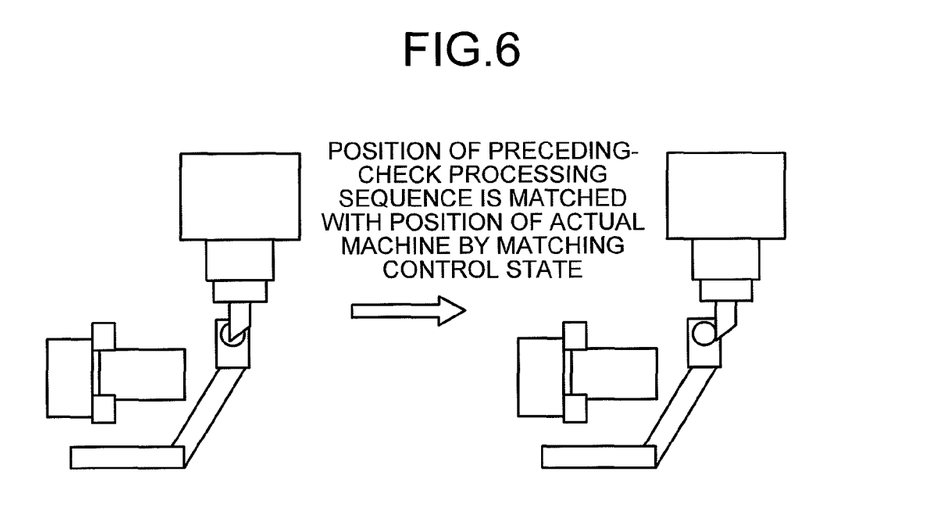
FIG. 6 is an explanatory diagram of an operation of the control-state synchronizing unit according to the first embodiment of the present invention when there is a skip command.

Immediately after the machine-control processing sequence 1 processes this command, as shown in FIG. 6, the control-state synchronizing unit 21 matches the state of the preceding-check processing sequence 2 with the state of the machine-control processing sequence 1, and thereafter, restarts the preceding-check processing sequence 2. The machine-control processing sequence 1 performs a process by waiting for the preceding-check processing sequence 2 by an amount set in advance.

According to the first embodiment, the preceding-check processing sequence 2 that performs a collision check ahead of an operation of an actual machine is provided separately from the machine-control processing sequence 1 that performs the operation of the actual machine. Further, a simulation of a signal of an instrumental device is performed, and a preceding check can be performed without waiting for a response from the actual instrumental device. Therefore, a collision check can be performed always ahead of the operation of the actual machine.

Further, at a starting time or an ending time of an operation of a machining program, a state of the preceding-check processing sequence 2 is matched with a state of the machine-control processing sequence 1. Because a state of the preceding-check processing sequence 2 is always the same as a state of the machine-control processing sequence 1, a collision check can be performed accurately.

In the first embodiment, it is explained that to perform a very accurate collision check, a present value, a selected tool, a control mode, a coordinate system, signals held in a device for a programmable logic control, and material shape data as data of the preceding-check processing sequence 2 are the same as the data (a present value, a selected tool, a control mode, a coordinate system, signals held in a device for a programmable logic control, and material shape data) of the machine-control processing sequence 1. However, the object of the present invention can be also achieved by matching only the present value of the preceding-check processing sequence 2 with the present value of the machine-control processing sequence 1.

Second Embodiment (Case of operating preceding-check processing sequence 2 faster than machine-control processing sequence 1 by applying override to preceding-check processing sequence 2. Corresponding to claims 1, 2, 4, and 5)

Figure 7:
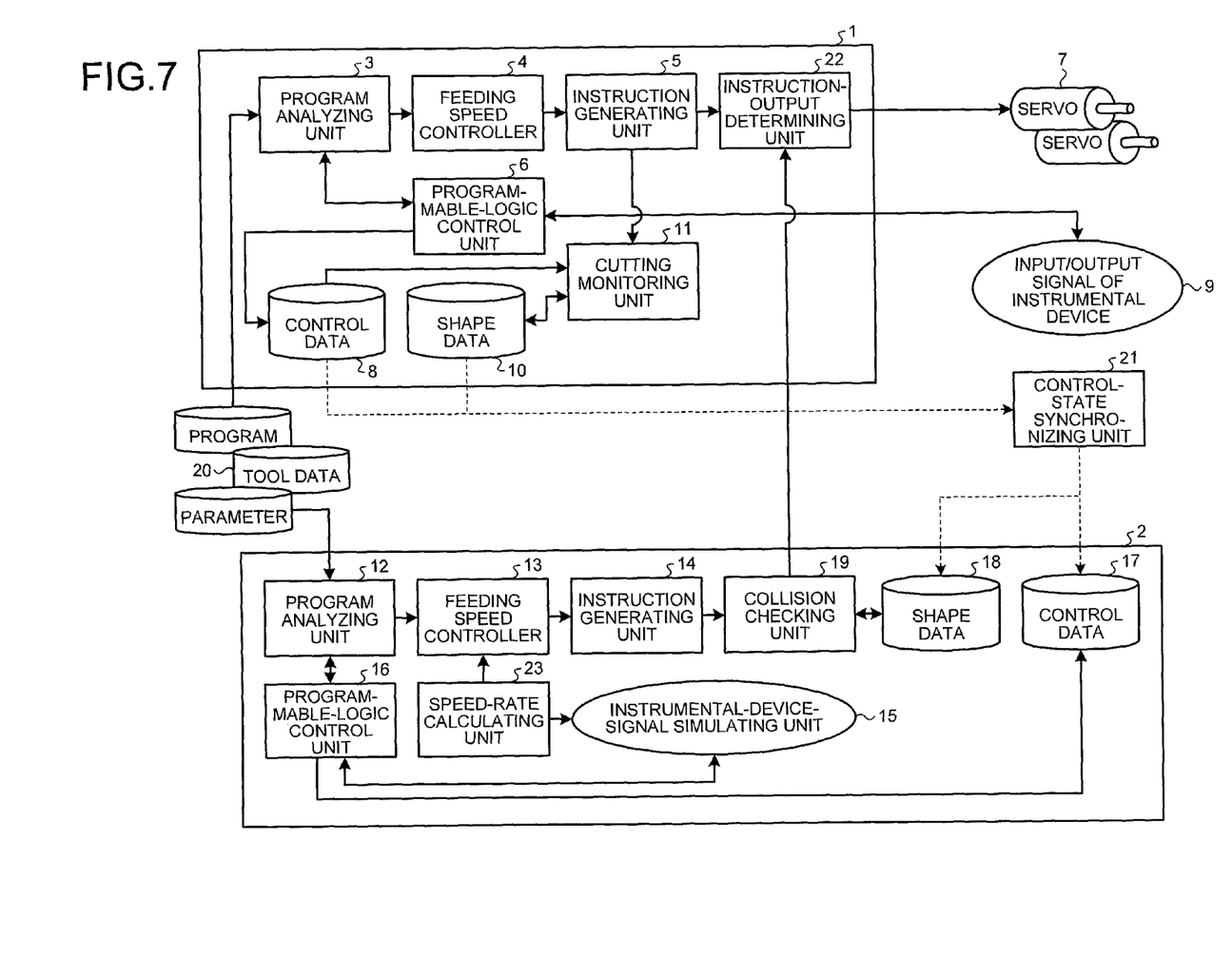
FIG. 7 is a block diagram of a configuration example of an NC apparatus according to a second embodiment of the present invention.

FIG. 7 depicts an NC apparatus according to a second embodiment of the present invention. As compared with the first embodiment, the preceding-check processing sequence 2 additionally includes a feeding-speed-rate calculating unit 23 that obtains a feeding speed at which an interpolated length per an interpolated cycle becomes a distance at which a collision is regarded to occur set in advance before starting an operation of the machining program and calculates a rate to a feeding speed described in the machining program.

An operation of the instrumental-device-signal simulating unit 15 is also different from that of the first embodiment.

Processes different from those of the first embodiment are explained below.

The feeding speed controller 13 of the preceding-check processing sequence 2 determines a feeding speed for a preceding check by multiplying a feeding speed rate for a preceding check calculated by the feeding-speed-rate calculating unit 23 as described above by a feeding speed described in the machining program.

As described in Japanese Patent Application Laid-open No. 2004-326257, this method makes it possible to perform a collision check by a shape simulation without a leakage and at a high speed, to cut excessive interpolation points for the collision check not to exceed a distance regarded to generate a collision.

To increase a feeding speed from that of an actual machining program in the preceding-check processing sequence 2 is to shorten a block consumption time within the preceding-check processing sequence 2.

Therefore, in the instrumental-device-signal simulating unit 15 within the preceding-check processing sequence 2, a response time of an instrumental device to be simulated also needs to be shortened according to a feeding speed rate for a preceding check.

Otherwise, operation timings of an NC axis and an instrumental device in the machine-control processing sequence 1 do not coincide with those in the preceding-check processing sequence 2.

A method that the instrumental-device-signal simulating unit 15 adjusts a signal response time of each instrumental device according to a feeding speed rate for a preceding check is explained below.

Even when a feeding speed for a preceding check is increased in the preceding-check processing sequence 2, an instruction concerning a position instructed by a machining program and an interpolation type (a linear interpolation assignment, an arc interpolation assignment or the like) naturally remain unchanged. Therefore, shape data of a tool in the preceding-check processing sequence 2 and a distance over which an actual tool moves in the machine-control processing sequence 1 are substantially the same.

Because a moving time is obtained by dividing a moving distance by a feeding speed, a moving time becomes a value obtained by dividing by a feeding speed rate when a rate for a preceding check is multiplied to a feeding speed.

Figure 8:
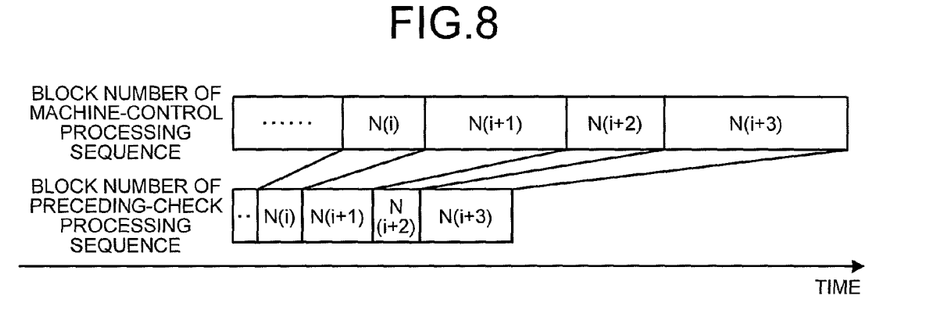
FIG. 8 is an explanatory diagram of a progress status of processes of a machine-control processing sequence and a preceding-check processing sequence according to the second embodiment of the present invention.

Because the above relationship is present between a feeding speed of an axis controlled by an NC and a moving time, both an NC axis and an instrumental device operate in the same time axis when a value obtained by dividing a response time of a signal of the instrumental device connected to an auxiliary machine not controlled by the NC by a feeding speed rate is used. For example, assume that N(i+2) in FIG. 8 is a command block to an instrumental device, and that other blocks (N(i), N(i+1), and N(j+3)) are command blocks to the NC axis. The consumption of blocks to the instrumental device (a time to response) is then also advanced at the same rate by a portion of NC-axis movement blocks of which consumption is advanced by multiplying a feeding speed of the NC axis by a rate for a preceding check in the preceding-check processing sequence 2.

That is, the instrumental-device-signal simulating unit 15 acquires a feeding speed rate for a preceding check calculated by the speed-rate calculating unit 23, obtains a value obtained by dividing a response time of a signal corresponding to each device by a feeding speed for a preceding check, and adjusts a response time of a device signal for a preceding check.

By adjusting a response time of an instrumental device according to a feeding speed rate in this manner, a relative positional relationship between the NC axis and the auxiliary machine in the machine-control processing sequence 1 can be also kept in the preceding-check processing sequence 2.

In the above explanations, the instrumental-device-signal simulating unit 15 performs a simulation of simulating a response signal of each instrumental device by simply adjusting a response time of each instrumental device. The middle of a movement can be also simulated together with a response time of an auxiliary machine connected to an instrumental device as follows.

For example, assume that there is an instruction to advance a tailstock operated by an instruction from a PLC to another control apparatus to near an end surface of a material, not controlled by an NC axis in a machining program.

A movement control of a tailstock of an auxiliary machine is only a command to move to a position A, issued from the PLC to a control apparatus of the tailstock, for example. Regarding an actual movement control, the process becomes a two-stage process that a control apparatus of a tailstock calculates each position to the position A and moves the tailstock. After finishing a movement, a signal of a movement completion of the tailstock is input to the PLC, and the PLC notifies this state to control data within the NC apparatus.

Not only a tailstock, but also an auxiliary machine generally takes this process procedure, and therefore the NC apparatus cannot recognize the position of the auxiliary machine in the middle of a movement.

Accordingly, when the instrumental-device-signal simulating unit 15 of the preceding-check processing sequence 2 receives a command from the PLC of the preceding-check processing sequence 2, an instrumental-device signal simulation of an auxiliary machine corresponding to the command operates, and the instrumental-device-signal simulating unit 15 simulates a movement of the auxiliary machine and a response signal. Therefore, the instrumental-device-signal simulating unit 15 calculates and transmits a position of every second based on a speed of the auxiliary axis set in advance as well as a response signal indicating a state such as operating, operation completed, and stopping. The PLC stores a response signal and a position of the auxiliary machine into control data. The collision checking unit gives a received position to a shape corresponding to the auxiliary machine out of machine shapes, moves this position together with a shape controlled by the NC controller, and performs a collision check.

In the NC apparatus having such a configuration, points checked by the preceding-check processing sequence 2 are cut within a range not overlooking a collision. Therefore, the time required for a collision checking process using shape data which tends to have high load decreases, and a collision check can be performed always ahead of an operation of an actual machine.

INDUSTRIAL APPLICABILITY

The numerical control method and the numerical control apparatus according to the present invention are suitable to be used for numerical control apparatuses that perform collision checks.

The invention claimed is:
1. A numerical control method providing a preceding-check processing sequence separately from a machine-control processing sequence for an actual machine control, wherein the numerical control method includes performing a collision possibility check in the preceding-check processing sequence ahead of an actual machine control, and matching a state of the preceding-check processing sequence with a state of the machine-control processing sequence during a period from when a machine stops until when the machine restarts an operation.

2. The numerical control method according to claim 1, wherein the state is a present value.

3. The numerical control method according to claim 1, wherein the state is a present value, a selected tool, a control mode, a coordinate system, signals held in a device for a programmable logic control, and material shape data.

4. The numerical control method according to claim 1, wherein the preceding-check processing sequence stops performing a collision possibility check during execution of a specific command.

5. The numerical control method according to claim 4, wherein the specific command is a skip command.

6. The numerical control method according to claim 1, wherein when performing an instrumental-device signal simulation to check a collision, the preceding-check processing sequence obtains a response time for each device set in advance, and delays a response by the obtained response time for each device.

7. The numerical control method according to claim 1, wherein the preceding-check processing sequence calculates a feeding speed for a preceding check based on a distance, at which a collision is regarded to occur, and an interpolation cycle, calculates a rate of a feeding speed for a preceding check to a feeding speed described in a machining program, and determines a feeding speed for a preceding check based on the calculated rate.

8. The numerical control method according to claim 7, wherein when performing an instrumental-device signal simulation to check a collision, the preceding-check processing sequence obtains a response time for each device set in advance, and adjusts the obtained response time for each device based on the rate of a feeding speed.

9. A numerical control apparatus comprising:
a machine-control processing sequence that includes a machining-program analyzing unit, a feeding speed controller, an instruction generating unit, a programmable-logic control unit, and an instruction-output determining unit that receives a check result from a preceding-check processing sequence and stops a machine before the machine reaches a collision detection position when a collision is detected, and performs an actual machine control;
the preceding-check processing sequence that includes a machining-program analyzing unit, a feeding speed controller, an instruction generating unit, a programmable-logic control unit, a collision checking processor that checks a collision possibility by using shape data and delivers a check result to an instruction-output determining unit of the machine-control processing sequence, and an instrumental-device-signal simulating unit that simulates a response signal of a device allocated to an instrument other than an NC control axis, and performs a collision possibility check ahead of an actual machine control by the machine-control processing sequence;
a monitor display unit that simulates by using shape data a state of machining with an actual machine, and sequentially displays a simulation on a screen; and
a control-state synchronizing unit that matches a state of the preceding-check processing sequence with a state of the machine-control processing sequence during a period from when a machine stops until when the machine restarts an operation.

10. The numerical control apparatus according to claim 9, wherein the state is a present value.

11. The numerical control apparatus according to claim 9, wherein the state is a present value, a selected tool, a control mode, a coordinate system, signals held in a device for a programmable logic control, and material shape data.

12. The numerical control apparatus according to claim 9, wherein the preceding-check processing sequence stops performing a collision possibility check during execution of a specific command.

13. The numerical control apparatus according to claim 12, wherein the specific command is a skip command.

14. The numerical control apparatus according to claim 9, wherein when performing an instrumental-device signal simulation to check a collision, the instrumental-device-signal simulating unit of the preceding-check processing sequence obtains a response time for each device set in advance, and delays a response by the obtained response time for each device.

15. The numerical control apparatus according to claim 9, wherein the preceding-check processing sequence includes a speed-rate calculating unit that calculates a feeding speed for a preceding check based on a distance at which a collision is regarded to have occurred and an interpolation cycle and calculates a rate of a feeding speed for a preceding check to a feeding speed described in a machining program, and determines a feeding speed for a preceding check based on the calculated rate.

16. The numerical control apparatus according to claim 15, wherein when performing an instrumental-device signal simulation to check a collision, the instrumental-device-signal simulating unit of the preceding-check processing sequence obtains a response time for each device set in advance, and adjusts the obtained response time for each device based on the rate of a feeding speed.

* * * * *